(12) United States Patent
Süess (10) Patent No.: US 7,270,209 B2
(45) Date of Patent: Sep. 18, 2007

(54) MODULAR FUEL STORAGE SYSTEM FOR A VEHICLE

(75) Inventor: Uwe Süess, Wiesbaden (DE)

(73) Assignee: General Motors Corporation, Detroit, MI (US)

( * ) Notice: Subject to any disclaimer, the term of this patent is extended or adjusted under 35 U.S.C. 154(b) by 405 days.

(21) Appl. No.: 10/915,236

(22) Filed: Aug. 10, 2004

(65) Prior Publication Data

US 2006/0033322 A1 Feb. 16, 2006

(51) Int. Cl.
*B60K 15/03* (2006.01)

(52) U.S. Cl. .................... 180/69.5; 224/538; 296/37.1; 296/37.14

(58) Field of Classification Search ............... 180/69.4, 180/69.5, 69.1; 280/830, 831, 834; 224/538, 224/539, 400, 440, 522, 533, 929; 220/901, 220/905; 296/37.1, 37.14
See application file for complete search history.

(56) References Cited

U.S. PATENT DOCUMENTS

| | | | | |
|---|---|---|---|---|
| 1,018,696 | A * | 2/1912 | Cronk | 224/511 |
| 4,228,936 | A * | 10/1980 | Rife | 224/42.23 |
| 5,114,060 | A * | 5/1992 | Boyer | 224/413 |
| 5,501,289 | A * | 3/1996 | Nishikawa et al. | 180/68.5 |
| 5,673,939 | A * | 10/1997 | Bees et al. | 280/831 |
| 6,257,360 | B1 * | 7/2001 | Wozniak et al. | 180/69.5 |
| 6,418,962 | B1 * | 7/2002 | Wozniak et al. | 137/266 |
| 6,481,751 | B1 * | 11/2002 | Davis et al. | 280/831 |
| 6,648,085 | B2 * | 11/2003 | Nagura et al. | 180/65.1 |
| 6,659,525 | B2 * | 12/2003 | Delavalle et al. | 296/37.2 |
| 6,676,163 | B2 * | 1/2004 | Joitescu et al. | 280/834 |
| 6,708,719 | B2 * | 3/2004 | Idoguchi | 137/266 |
| 6,896,318 | B2 * | 5/2005 | Marrs et al. | 296/191 |
| 6,923,282 | B2 * | 8/2005 | Chernoff et al. | 180/65.3 |
| 6,974,156 | B2 * | 12/2005 | Kosuge et al. | 280/831 |
| 7,000,716 | B2 * | 2/2006 | Leifert | 180/65.1 |
| 2004/0026427 | A1 * | 2/2004 | Shigematsu | 220/562 |

OTHER PUBLICATIONS

"Muscle Car Era Meets Future Technology in New Concept Dodge Charger R/T" [online]; [retrieved from http://www.theautochannel.com/news/press/date/19990103/press001982.html?TACH], Jan. 4, 1999.

Tiller, P.E. et al., "*Development of an Integrated Storage System for a Mid-Size Automobile*" presented on May 26-28, 1998 conference in Cologne, Germany.

"Tanks for the Long Haul"; [online]; [retrieved from http://www.car-truck.com/chryed/concept/charger3.htm]; believed to exist prior to Dec. 12, 2002.

* cited by examiner

*Primary Examiner*—Christopher P. Ellis
*Assistant Examiner*—John D Walters
(74) *Attorney, Agent, or Firm*—Harness, Dickey & Pierce P.L.C.

(57) ABSTRACT

A gaseous fuel storage system for a vehicle is disclosed. The fuel storage system can be installed as a modular unit in the vehicle. The fuel storage system is pivotable relative to the vehicle to allow easy accessibility to the storage tanks without requiring the storage tanks to be unmounted from the vehicle. The fuel storage system also provides protection for the storage tanks through the use of shielding and energy absorbing material.

32 Claims, 7 Drawing Sheets

MODULAR FUEL STORAGE SYSTEM FOR A VEHICLE

FIELD OF THE INVENTION

The present invention relates to fuel storage systems and, more specifically, to fuel storage systems for a mobile platform.

BACKGROUND OF THE INVENTION

With the changing emissions requirements for vehicles (e.g., automobiles, buses, trucks, etc.) alternative drives (e.g., fuel cell systems) and/or fuels (e.g., hydrogen, liquid natural gas, propane, etc.) are being implemented on the vehicles. To provide efficient storage of these alternate fuels, the fuels are stored at elevated pressures to densify the gas and provide more of the gas in a given volume of space. To facilitate the storing of these gases at higher elevated pressures, cylindrical or cylindrical-like storage tanks are typically employed.

Today's vehicles are not designed for mounting a high pressure storage tank thereon. That is, today's vehicles typically store their liquid fuel in a zero pressure or slightly pressurized storage tank that is positioned adjacent the undercarriage of the vehicle and is shaped to conform to the available space of the undercarriage. With the ability of the liquid fuel storage tanks to be shaped to conform to the configuration of the undercarriage, the undercarriages have not been designed for efficient or optimal use of high pressure cylindrical storage tanks. Additionally, the vehicles and the undercarriage are not configured to provide the high pressure storage tanks protection from the hazards of driving and in the event of a collision.

Accordingly, it is advantageous to provide a fuel storage system that can be attached to a vehicle and accommodate a high pressure storage tank. It would be advantageous if such a system were to incorporate protection for the high pressure storage tanks to protect against hazards from movement of the vehicle and/or a collision. To facilitate the servicing of the fuel storage system, it would be advantageous if the fuel storage system were easily accessible and could remain mounted to the vehicle during the servicing operation. Additionally, to facilitate the assembly of these vehicles it is advantageous to provide a fuel storage system that can be attached to the vehicle as a modular unit.

SUMMARY OF THE INVENTION

A fuel storage system according to the principles of the present invention can be incorporated into a vehicle and installed as a modular unit. Additionally, the fuel storage system allows easy accessibility to the storage tanks without requiring the storage tanks to be unmounted from the vehicle. The fuel storage system also provides protection for these high pressure storage tanks through the use of shielding and energy absorbing material.

A modular fuel storage assembly for a vehicle according to the principles of the present invention is disclosed. The modular fuel storage assembly includes at least one storage tank that is operable to store fuel and to supply stored fuel. There is a frame that is operable to support the storage tank. The storage tank is attached to the frame and the frame and the attached storage tank are adapted to be installed in the vehicle as a modular unit.

In another aspect according to the principles of the present invention, a fuel storage assembly for a vehicle is disclosed. The fuel storage assembly includes a frame that is operable between first and second positions. There is at least one storage tank that is operable to store fuel and to supply stored fuel. The storage tank is mounted to the frame and moves with the movement of the frame between the first and second positions.

An automotive vehicle with a fuel storage system according to the principles of the present invention is also disclosed. The automotive vehicle includes a body and a fuel storage system. The fuel storage system includes a cradle that is operable between first and second positions. There is also at least one storage tank that is operable to store fuel and to supply stored fuel. The storage tank is mounted to the cradle and moves with movement of the cradle between the first and second positions.

A method of installing a modular fuel storage system onto a vehicle according to the principles of the present invention wherein the modular fuel storage system includes a cradle operable between first and second positions and at least one storage tank coupled to the cradle is disclosed. The method includes (1) preassembling the at least one storage tank to the cradle at a first station removed from the vehicle; and (2) assembling the modular fuel storage system onto the vehicle at a second station.

Additionally, a method of servicing a fuel storage system on a vehicle wherein the fuel storage system has a frame operable between first and second positions and at least one storage tank connected to the frame and moving with the movement of the frame between the first and second positions according to the principles of the present invention is disclosed. The method includes: (1) moving the frame from the first position to the second position; (2) servicing the fuel storage system; and (3) moving the frame from the second position to the first position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8 is a cross-sectional view of an alternate configuration of the second preferred embodiment of the fuel storage system of FIG. 5.

DETAILED DESCRIPTION OF THE PREFERRED EMBODIMENTS

The following description of the preferred embodiment(s) is merely exemplary in nature and is in no way intended to limit the invention, its application, or uses.

Figure 1:
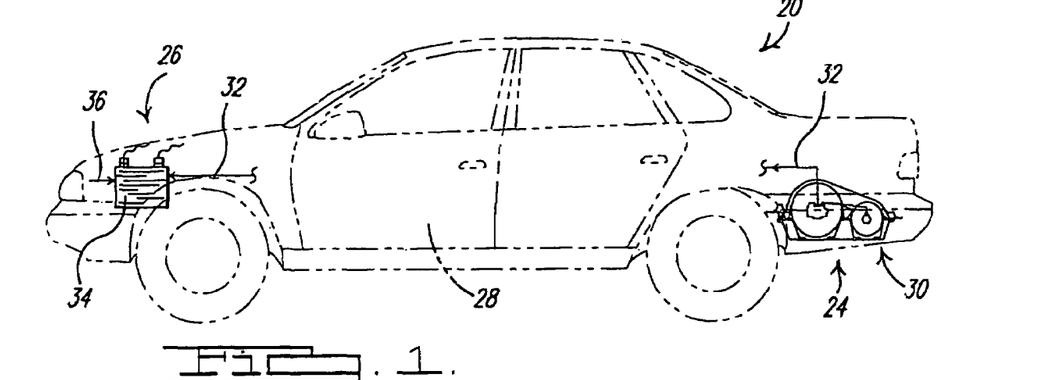
FIG. 1 is a simplified elevation view of a vehicle powered by a fuel cell system and having a fuel storage system according to the principles of the present invention.

Referring to FIG. 1, a vehicle 20, in this case a passenger vehicle, with a fuel storage system 24 according to the principles of the present invention and a fuel cell system 26 is illustrated. Vehicle 20 has a body 28 and an undercarriage 30 to which fuel storage system 24 is mounted. Fuel storage system 24 is operable to store a fuel and to supply a stored fuel to fuel cell system 26 via fuel stream 32, as described below. Alternatively, vehicle 20 can have an internal combustion engine (not shown) which receives fuel stream 32 from fuel storage system 24. Fuel cell system 26 includes a fuel cell stack 34 that is comprised of a plurality of fuel cells and is operable to react fuel stream 32 with an oxidant stream 36 to produce electrical power, as known in the fuel cell art. In proton exchange membrane (PEM) type fuel cells, hydrogen is supplied to the anode of the fuel cell, and oxygen is supplied to the cathode. Accordingly, when fuel cell stack 34 uses PEM type fuel cells, fuel stream 32 is a hydrogen-containing stream and oxidant stream 36 is an oxygen-containing stream. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which serve as current collectors for the anode and cathode, and contain appropriate channels and/or openings therein for distributing the fuel cell's gaseous reactants over the surfaces of the respective anode and cathode catalyst. A typical PEM fuel cell and its MEA are described in U.S. Pat. Nos. 5,272,017 and 5,316,871 issued respectively Dec. 21, 1993 and May 31, 1994 and assigned to General Motors Corporation, the disclosures of which are herein incorporated by reference.

The term "fuel cell" is typically used to refer to either a single cell or a plurality of cells depending on the context. A plurality of individual cells are commonly bundled together to form a fuel cell stack. Each cell within the stack comprises the MEA described earlier, and each such MEA provides its increment of voltage. Typical arrangements of multiple cells in a stack are described in U.S. Pat. No. 5,763,113 assigned to General Motors Corporation, and which is herein incorporated by reference. While fuel cell stack 34 is described as a proton exchange membrane type of fuel cell stack, it should be appreciated that other fuel cell stacks can be employed without departing from the scope of the present invention. Electrical power produced by fuel cell system 24 is used to provide electrical power to vehicle 20 which can be used to propel vehicle 20 through the use of electrical motors.

Figure 2A:
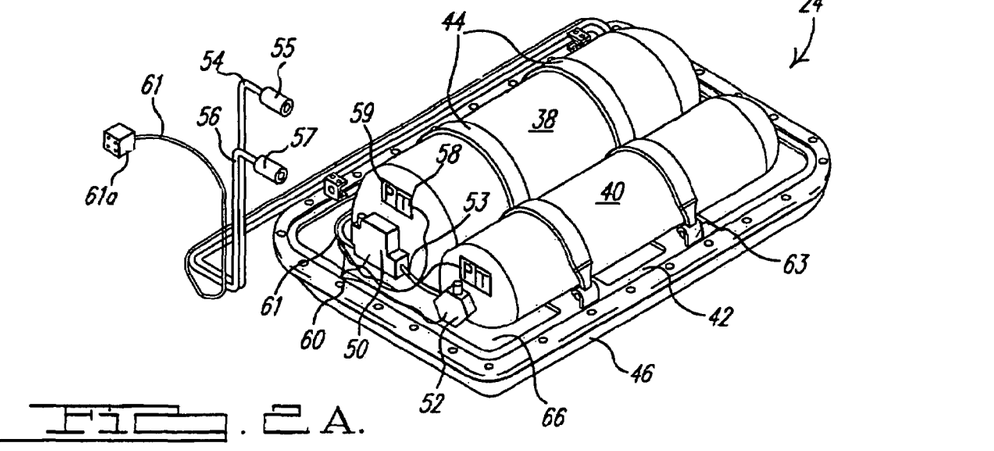
FIGS. 2A-B are perspective views of a fuel storage system according to the principles of the present invention illustrating strap mounting and neck mounting of the storage tanks to the frame respectively.
Figure 3A:
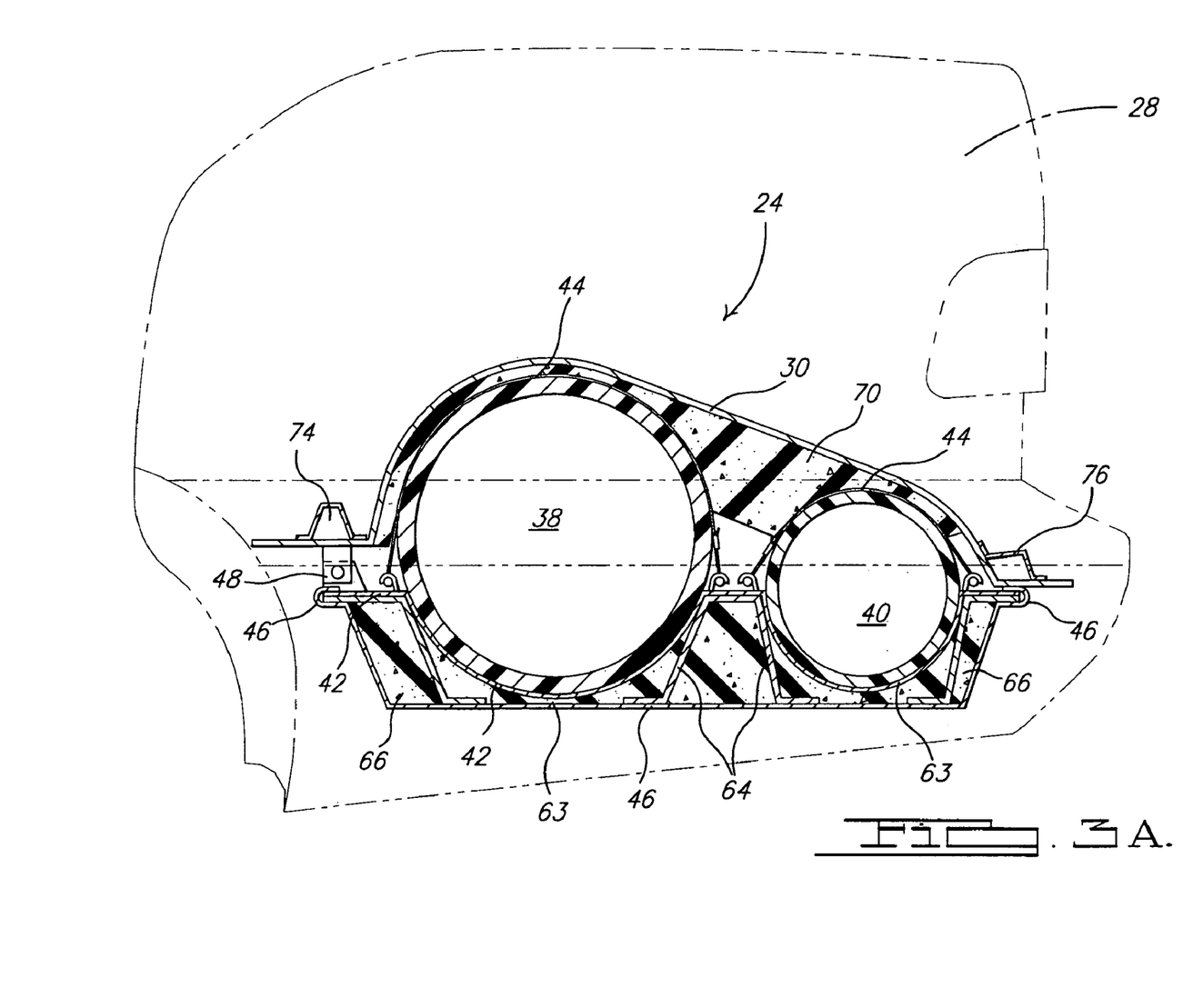
FIGS. 3A-B are fragmented simplified cross-sectional views of the fuel storage system of FIG. 1 installed on the vehicle in respective operational and serviceable positions.
Figure 3B:
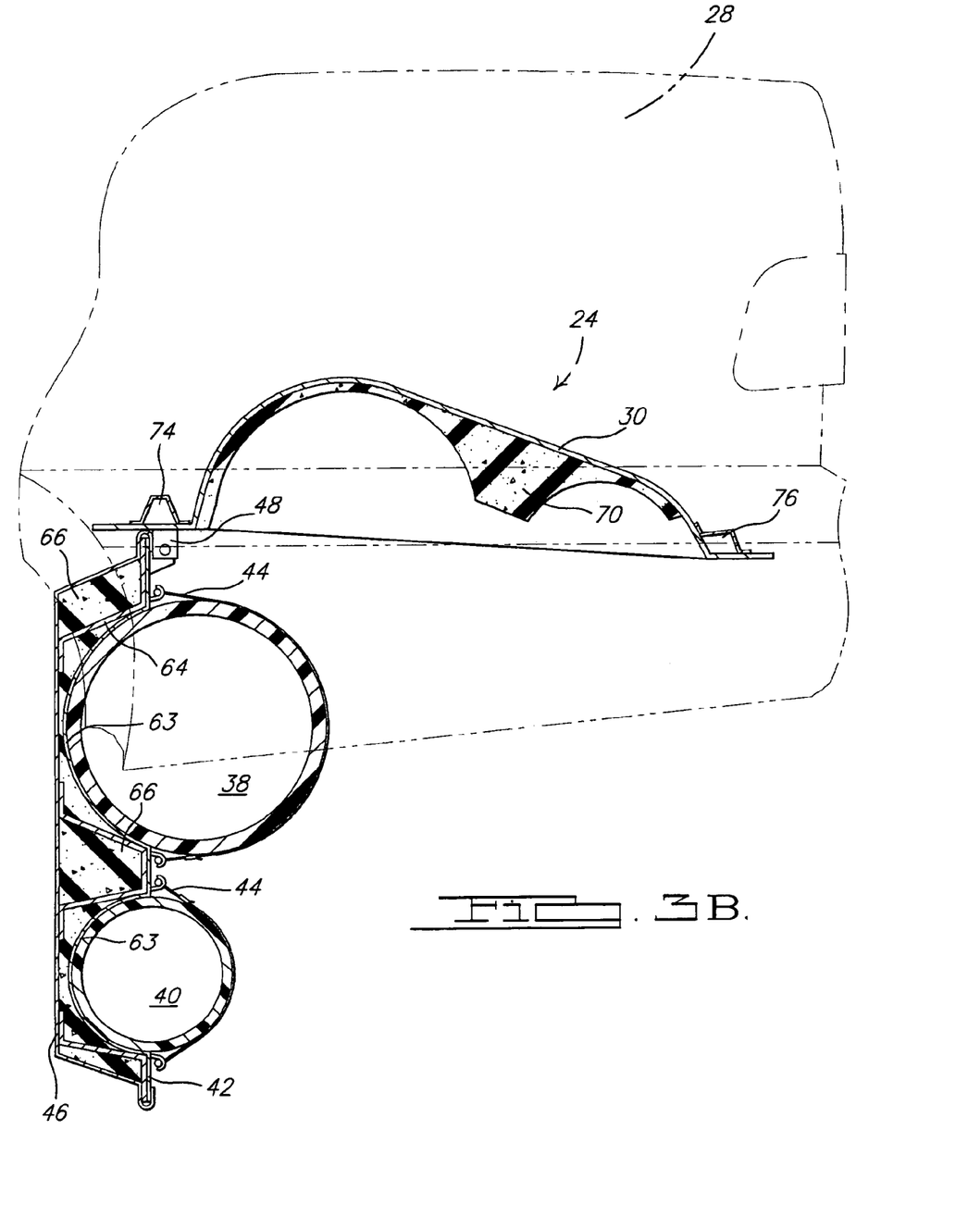

Referring now to FIGS. 2A and 3A-B, a first preferred embodiment of fuel storage system 24 is shown. Fuel storage system 24 includes a pair of storage tanks 38 and 40 that are mounted to a frame 42 via straps 44. Frame 42 provides structural support for storage tanks 38 and 40. Accordingly, frame 42 is preferably a rigid and strong material. Preferably, frame 42 is metallic and made from steel, aluminum or alloys thereof. The strap mounting of storage tanks 38 and 40 to frame 42 provides for a generally uniform support load which is especially important for larger storage tanks 38 and 40. The strap mounting also provides good vibration damping. A shield or outer layer 46 is attached to frame 42 and covers an underside of frame 42 and storage tanks 38 and 40.

Shield 46 is spaced apart from the underside of storage tanks 38 and 40 and functions to protect fuel storage system 24 from being damaged while vehicle 20 is being operated. Shield 46 does not need to provide structural support for storage tanks 38 and 40 because frame 42 provides the structural support. Preferably, shield 46 is made from a material that is deformable without breaking and can withstand being hit by debris as vehicle 20 is moving. Preferably, shield 46 is metallic and made from steel, aluminum or alloys thereof. However, it should be appreciated that other materials, such as plastics, can be employed for shield 46 without departing from the scope of the present invention. Shield 46 can be attached to frame 42 in a variety of ways. For example, shield 46 can be welded to frame 42.

Storage tanks 38 and 40 are designed to store the fuel for vehicle 20. Storage tanks 38 and 40 are designed to store the fuel at an elevated pressure to densify the fuel and maximize the fuel storage for the available space. To provide densification of the fuel, storage tanks 38 and 40 are preferably designed to be able to accommodate a pressure of at least 70 MPa. It should be appreciated, however, that lower and higher pressures can be utilized and storage tanks 38 and 40 can be designed to accommodate the lower and higher pressures without departing from the scope of the present invention. In addition to being capable of storing the fuel at these high pressures, storage tanks 38 and 40 should also be designed to resist puncturing in the event of incidental contact with a foreign object such as in the event of a collision of vehicle 20. A variety of storage tanks can be employed that have the above-stated characteristics. For example, storage tanks 38 and 40 can be Type III storage tanks that include a metal liner or Type IV storage tanks that are made from composite materials and plastics such as high density polyethylene and carbon fiber. Type IV tanks experience growth as they are pressurized and, accordingly, when Type IV tanks are used frame 42 and straps 44 are configured to allow for the change in dimensions of storage tanks 38 and 40 as the pressure within storage tanks 38 and 40 varies. Additionally, as shown, storage tanks 38 and 40 are of differing sizes. The differing sizes are chosen to provide efficient storage of the fuel in the space that is available. That is, the specific size of each storage tank 38 and 40 is chosen to provide for efficient storage of the fuel in the space that is available. To this end, along with adjusting the size of the storage tanks, the number of storage tanks that are employed can also vary. For example, three storage tanks of the same or of differing sizes can be employed if such provides for efficient storage of fuel in the space available on vehicle 20. Thus, the size of storage tanks 38 and 40 and the number of storage tanks will vary without departing from the scope of the present invention.

A pair of hinges 48 are attached to frame 42 and are used to connect frame 42 to vehicle 20, as described below. Hinges 48 allow frame 42 to be pivoted relative to vehicle 20 to allow access to fuel storage system 24, as described below and shown in FIGS. 3A-B. There is a flow control device, in this case in the form of a pair of pressure regulators 50 and 52 that are attached to respective storage tanks 38 and 40. Pressure regulators 50 and 52 are interconnected by fuel line 53 and are operable to control the pressure of fuel supplied by storage tanks 38 and 40. Fuel line 53 enables fuel to be routed between regulators 50 and 52 and between storage tanks 38 and 40 via regulators 50 and 52. A fuel fill line 54 is attached to one of regulators 50 and 52 and allows storage tanks 38 and 40 to be filled with fuel. Fuel fill line 54 has a fitting 55 on its end that is configured to be connected to a complementary receptacle (not shown) on vehicle 20 to allow storage tanks 38 and 40 to be filled with fuel from a convenient location on vehicle 20. A fuel supply line 56 is connected to the other of regulators 50 and 52. Fuel supply line 56 is operable to supply fuel from storage tanks 38 and 40 to fuel cell system 26 as fuel stream 32. Fuel supply line 56 has a fitting 57 that is configured to be attached to a complementary receptacle (not shown) on vehicle 20 to supply fuel to fuel cell system 26. Fuel storage system 20 also includes temperature sensors 58 that measure the fuel temperature inside tanks 38, 40 and pressure sensors 59 that measure the pressure inside tanks 38, 40 and/or fuel lines 53, 54, 56. Additionally, fuel storage system 24 may include one or more electrically controlled solenoids (not shown) that work with pressure regulators 50, 52 to control the flow of fuel between storage tanks 38, 40 and fuel cell stack 34. Fuel storage system 24 also includes a ground cable 60 that is used to ground storage tanks. 38, 40 to body 28 of vehicle 20. Ground cable 60 is bundled together with the rest of the electrical leads for the various components of fuel storage system 24 and are routed from an interior of fuel storage system 24 to an exterior of fuel system 24 as a bundle 61 having a fitting 61a that can be attached to a complementary receptacle (not shown) on vehicle 20 to connect then electronic controls and sensors of fuel storage system 24 to the control systems onboard vehicle 20. It should be appreciated that frame 42 and/or shield 46 are provided with a recess (not shown) to allow fill and supply lines 54 and 56 along with bundle 61 of electrical wires to pass from an interior of fuel storage system 24 to an exterior of fuel system 24 so that they can be connected to complementary receptacles on vehicle 20.

Figure 2B:
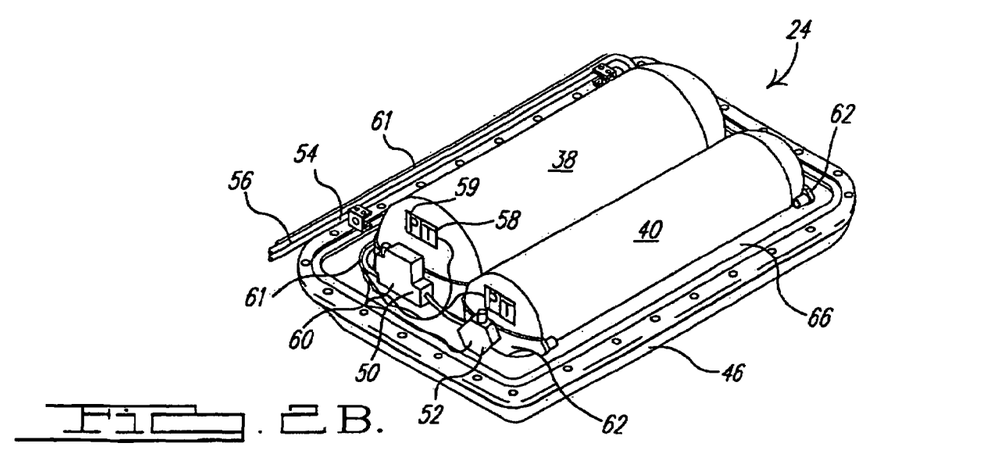

Referring now to FIG. 2B, an alternate way to mount storage tanks 38 and 40 to frame 42 is shown. In this alternate embodiment, storage tanks 38 and 40 are neck mounted to frame 42. That is, there are a pair of supports 62 that encompass portions of each end of storage tanks 38 and 40 and are connected to frame 42. The supports 62 concentrate the resulting loads at polar bosses and are better suited for mounting smaller tanks. The neck mounting of storage tanks 38 to frame 42 with support 62 does not provide as good vibration damping as the preferred use of strap mounting. Supports 62 have openings or slots that allow regulators 50 and 52 to be attached to one end of storage tanks 38 and 40 without interference by support 62 and function the same as described above with reference to the strap mounting of storage tanks 38 and 40 to frame 42.

Referring now to FIGS. 3A and B, it can be seen that a portion 63 of frame 42 is configured to generally conform to the exterior shape of storage tanks 38 and 40 to form a cradle supporting storage tanks 38 and 40. Straps 44 are attached to frame 42 adjacent the portions 63 of frame 42 that are supporting storage tanks 38 and 40. The cradle portions 63 of frame 42 can extend an entire length of storage tanks 38 and 40 or just a portion(s) thereof depending on the support needs of storage tanks 38 and 40. Configuring the cradle portions 63 of frame 42 to extend only along discrete portions of storage tanks 38 and 40 reduces the weight of frame 42. Additionally, frame 42 has a plurality of reinforcement members 64 that extend from frame 42 and contact shield 46. Reinforcement members 64 provide structure to stiffen shield 46 and to help absorb energy in the event of a collision of vehicle 20 or a foreign object colliding with shield 46.

An optional foam member 66 is positioned between frame 42 and shield 46. One side of foam member 66 is contoured to generally match the contour of shield 46 While the opposite side of foam member 46 is contoured to generally follow the shape of the outer surface of storage tanks 38 and 40. Foam member 46 does not need to fit tightly against shield 46 and/or against storage tanks 38 and 40. Foam member 66 functions as an energy absorbing material to absorb and dissipate energy in the event of a collision of vehicle 20 and/or an object colliding with fuel storage system 24. Foam member 66 is preferably a semi-rigid closed cell foam. A variety of different types of foam can be used to make foam member 66. For example foam member 66 can be made from PU (Polyurethane), Epoxy-Foam and PMI (Polymethacrylimide). However, it should be appreciated that other types of materials, such as an open cell foam or other impact absorbing materials and structures (e.g., honeycomb structure), can also be employed without departing from the scope of the present invention.

Also optionally, a foam member 70 can be employed on the undercarriage of vehicle 20 to provide additional energy absorption in the event of a collision. Foam member 70 has one surface that is configured to correspond to the contour of the undercarriage 30 while the opposite surface of foam member 70 is contoured to generally conform to the outer surface of storage tanks 38 and 40. It should be appreciated, however, that the contouring of foam member 70 does not need to conform exactly to the outer surface of storage tanks 38 and 40 and that gaps between storage tanks 38 and 40 and foam member 70 are acceptable. Foam member 70 can be made from the same material as foam member 66 discussed above.

Fuel storage system 24 is mounted to undercarriage 30 of vehicle 20. Specifically, hinges 48 are mounted to a cross member 74 that extends transversely across a portion of undercarriage 30 of vehicle 20. The mounting of fuel storage system 24 to undercarriage 30 with hinges 48 allows frame 42 to pivot relative to vehicle 20. Specifically, frame 42 can move between a closed or operational position of fuel storage system 24, as shown in FIG. 3A, to an open or serviceable position to allow service to be performed on fuel storage system 24, as shown in FIG. 3B. This ability of frame 42 to move between these two positions facilitates the servicing of fuel storage system 24 on vehicle 20 and does not require the removal of fuel storage system 24 from vehicle 20 for servicing. That is, when fuel storage system 24 requires service, vehicle 20 can be elevated and fuel storage system 24 can be moved to its open position. When in the open position a person working on fuel storage system 24 has easy access to storage tanks 38, 40, regulators 50 and 52, fill and supply lines 54 and 56, sensors 58, 59 and any other component of fuel storage system 24. Accordingly, the pivotal mounting of fuel storage system 24 to vehicle 20 facilitates the servicing of fuel storage system 24 which results in a reduction in the time and cost to perform a servicing operation. The use of hinges to mount frame 42 to undercarriage 30 also facilitates the installation of fuel storage system 24 on vehicle 20, as described below.

Fuel storage system 24 can be secured in its closed position by the use of one or more latching members (not shown) that hold the side of frame 42 opposite hinges 48 against another cross member 76 that also extends transversely across a portion of undercarriage 30 of vehicle 20. The securing of frame 42 against cross member 76 can be performed by mechanical fasteners such as locking latches, bolts or screws. It should be appreciated, however, that other methods can be employed to secure frame 42 against cross member 76 without departing from the scope of the present invention.

Fuel storage system 24 does not function as a secondary containment in the event of a leakage of fuel from storage tanks 38 and 40 or any other components of fuel storage system 24. Because fuel storage system 24 does not function as a secondary containment, fuel storage system 24 is not required to form a fluid tight seal against undercarriage 30 of vehicle 20 while in the closed position. However, due to the enclosing nature of fuel storage system 24, a fuel sensor (not shown), such as a hydrogen sensor, can be employed along undercarriage 30 and/or in fuel storage system 24 to indicate the presence of a leak. Foam members 66 and 70 fill in a majority of the voids in the compartment formed by fuel storage system 24 and undercarriage 30 of vehicle 20. The filling of these voids helps to avoid the accumulation of hydrogen or other fuel that may leak from any of the components that comprise fuel storage system 24. Additionally, foam members 66 and 70 can be provided with an optional barrier, such as a metallic foil layer, to inhibit the permeation of leaking fuel into the cells of foam members 66 and 70.

Fuel storage system 24 is installed in vehicle 20 as a modular unit. That is, frame 42, storage tanks 38 and 40, straps 44, shield 46, regulators 50 and 52, fill and supply lines 54 and 56, sensors 58, 59, ground cable 60, bundle 61 and foam member 66 are preassembled in a separate facility or in a static station, preferably with the exterior surface of shield 46 facing down. Then, fuel storage system 24 is installed on undercarriage 30 of vehicle 20 as a modular unit on the assembly line, which may be a moving one. To install modular fuel storage system 24, hinges 48 are aligned with the appropriate location on cross member 74 and attached thereto. Hinges 48 are preferably attached to cross member 74 with bolts. However, it should be understood that other means of attaching hinges 48 to cross member 74 can alternately be employed. For example, hinges 48 can be welded to cross member 74 if desired.

After attaching hinges 48 to cross member 74, fill line 54 via fitting 55 can be attached to a complementary receptacle on vehicle 20. Likewise, supply line 56 can be connected via fitting 58 and bundle 61 connected via fitting 61a to complementary receptacles on vehicle 20. Furthermore, any other additional connections such as electrical connections or instrumentation connections (not shown) can also be connected at this time. Fuel storage system 24 can then be pivoted so that the side of frame 42 opposite hinges 48 is adjacent cross members 76. Frame 42 can then be secured against cross member 76. Preferably, frame 42 is secured against cross member 76 with bolts.

Figure 4A:
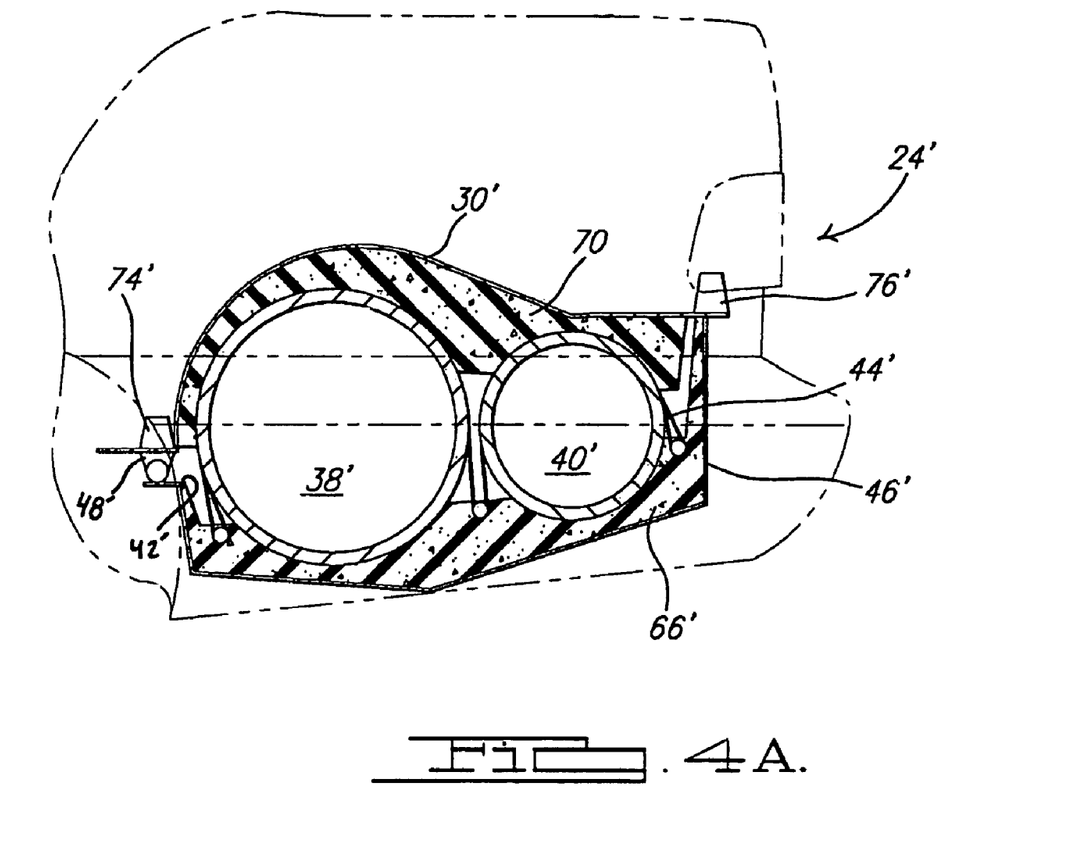
FIG. 4A-B are fragmented simplified cross-sectional views of an alternate configuration of a fuel storage system according to the principles of the present invention installed on a vehicle in respective operational and serviceable positions.
Figure 4B:
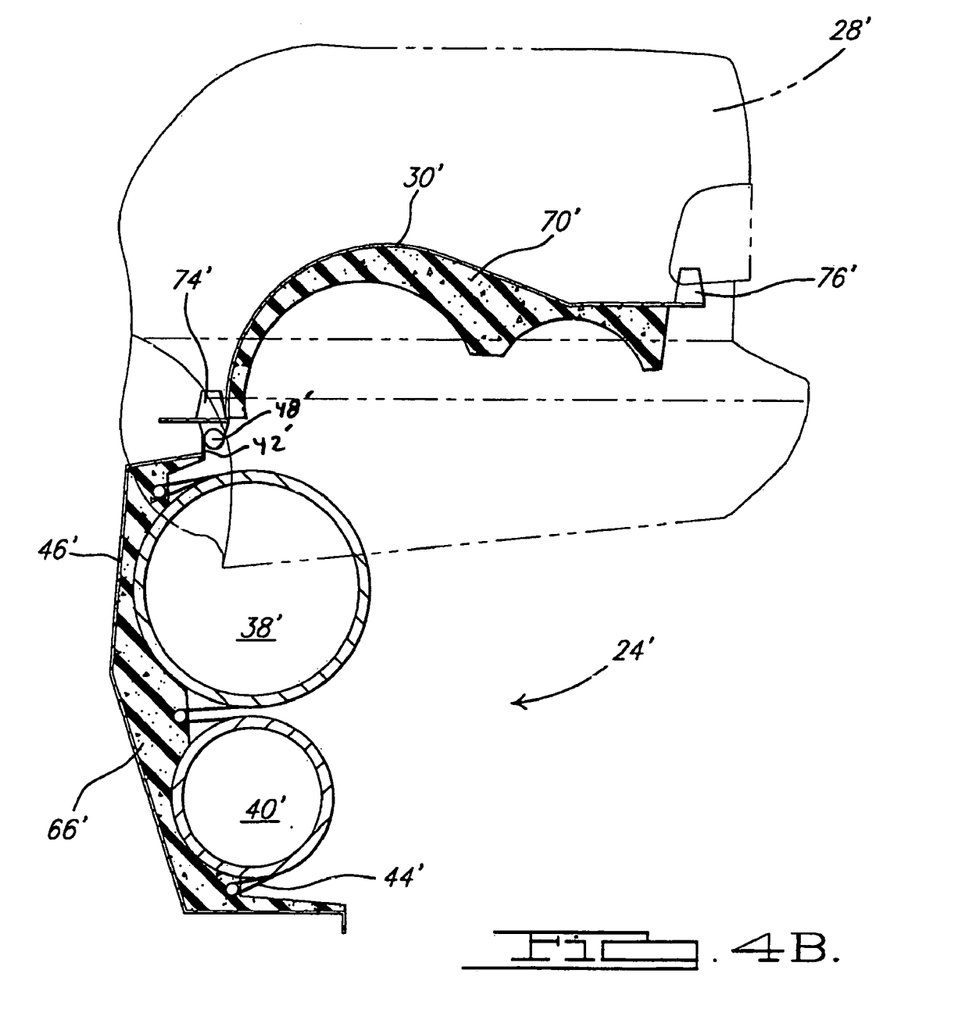

Referring now to FIGS. 4A and B, an alternate configuration for fuel storage system 24 is illustrated. The alternate configuration for fuel storage system 24' is essentially the same as that disclosed in FIGS. 2A-3B. As such, fuel storage system 24' uses straps 44' to secure storage tanks 38', 40' to frame 42'. Foam members 66' are optionally positioned between frame 42' and shield 46'. Hinge 48' can be secured to a cross member 74' with bolts. The side of frame 42' opposite hinges 48' can be secured to another cross member 76'. The main differences being that frame 42' is configured so that longitudinal center lines (not shown) of storage tanks 38' and 40' are aligned on the same horizontal plane to provide efficient storage of fuel for the specific configuration of undercarriage 30'. Additionally, frame 42' does not include reinforcement members 64 extending downwardly in contact with shield 46'. Furthermore, shield 46' has a different configuration that is dictated by the configuration of undercarriage 30' and the need to shield fuel storage system 24' from damage.

Figure 5:
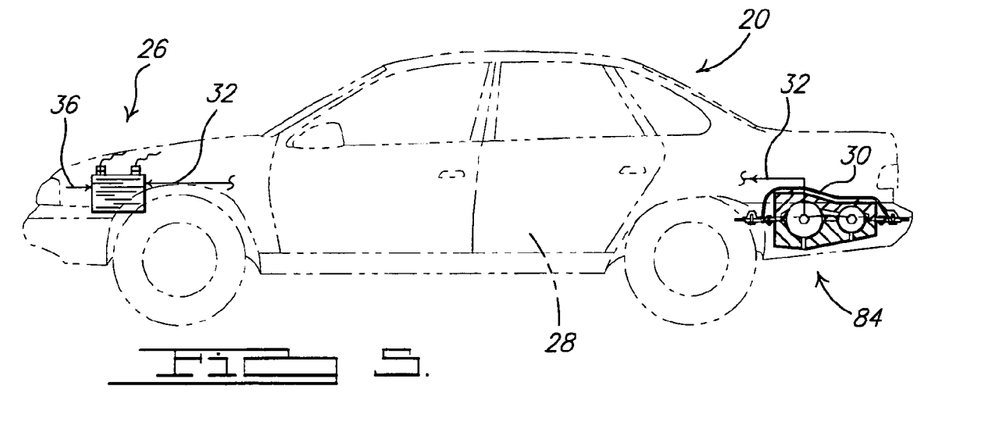
FIG. 5 is a simplified elevation view of a vehicle powered by a fuel cell system and having a second preferred embodiment of a fuel storage system according to the principles of the present invention.

Referring now to FIG. 5, vehicle 20 is shown with a second embodiment of a fuel storage system 84 according to the principles of the present invention. Fuel storage system 84 utilizes a case 86 that surrounds a pair of storage tanks 88, 90. Storage tanks 88, 90 are the same as storage tanks 38, 40 discussed above. Case 86 is attached to undercarriage 30 of vehicle 20. Case 86 provides for protection of fuel storage system 84 and more particularly storage tanks 88, 90 from damage caused by debris or other foreign materials hitting fuel storage system 84 as vehicle 20 moves and/or in the event of a collision.

Figure 6:
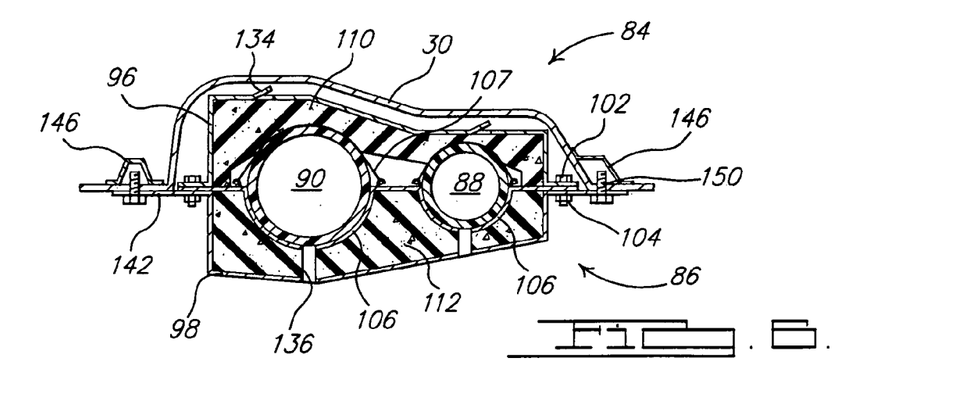
FIG. 6 is a cross-sectional view of the fuel storage system of FIG. 5.
Figure 7:
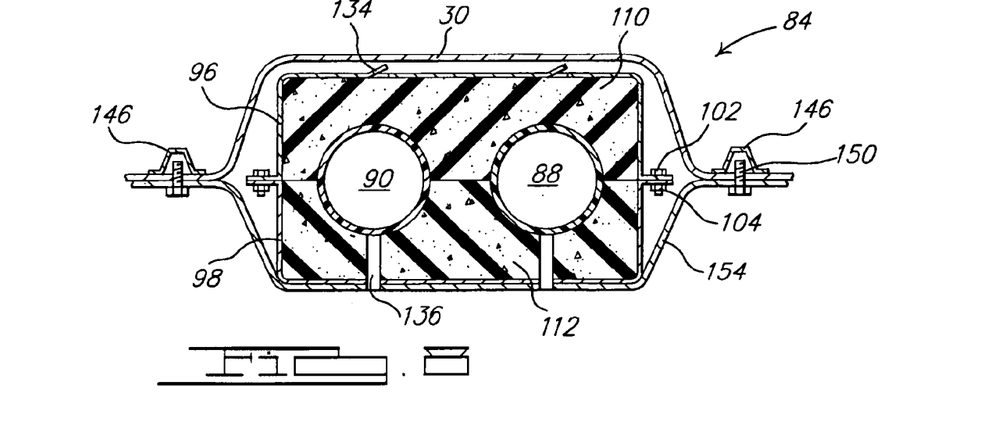
FIG. 7 is an exploded view of the fuel storage system of FIG. 5.

Case 86 is comprised of a first or upper portion 96 that is configured to surround a portion of storage tanks 88, 90 and a second or lower portion 98 that is configured to surround the remaining portion of storage tanks 88, 90. Upper and lower portions 96 and 98 are attached together to form case 86 which protect storage tanks 88, 90. Upper and lower portions 96 and 98 can be attached together in a variety of ways. For example, as shown in FIGS. 6 and 7, bolts 102 and complementary nuts 104 are used to secure upper and lower portions 96 and 98 together. Alternately, screws, clamps, hinges or other mechanical type fasteners can be used. Upper and lower portions 96 and 98 do not need to be attached together in a fluid tight manner as case 86 is not meant to act as a secondary containment for the fuel in tanks 88, 90.

The external shape of upper and lower portions 96 and 98 can vary to accommodate the location on vehicle 20 within which fuel storage system 84 is located. That is, as shown in FIG. 6, the upper and lower portions 96 and 98 have an outer surface that varies as it extends between opposite sides. This outer configuration is contoured to be complementary to a contour of undercarriage 30 of vehicle 20. In contrast, as shown in FIG. 8 (which is an alternate embodiment of fuel storage system 84), the outer configuration of upper and lower portions 96 and 98 can be generally uniform and provide for a rectangular type enclosure when the configuration of undercarriage 30 facilitates such configuration for upper and/or lower portions 96 and 98. Thus, the external configuration of case 86 can vary and can be customized to conform to the available space on vehicle 20 within which fuel storage system 84 is disposed. Preferably, the external configuration of case 86 is configured to make efficient use of the available space in vehicle 20 within which fuel storage system 86 is disposed.

In addition to customizing the external configuration of case 86 to efficiently use the available space in vehicle 20, the size and number of storage tanks 88, 90 that are used is also chosen to make efficient use of the available space. In other words, as can be seen in FIG. 6, when the available space in vehicle 20 is not uniform, it may be advantageous to provide storage tanks 88, 90 of differing sizes. Specifically, where there is less space available, a smaller diameter storage tank 88 is employed and where a larger space is available a larger diameter storage tank 90 is utilized. When the available space is generally uniform the same size storage tanks 88, 90 can be utilized, as shown in FIG. 8. Additionally, it should be appreciated that a single storage tank can be employed or more than two storage tanks can be employed to efficiently use the available space within vehicle 20 in which fuel storage system 84 is disposed without departing from the scope of the present invention. Thus, the number and size of storage tanks 88, 90 can be chosen to make efficient use of the available space within which fuel storage system 84 is to be disposed on vehicle 20.

Lower portion 98 has a pair of braces 106 that extend between sides of lower portion 98 transverse to the orientation of storage tanks 88,90. Braces 106 are complementary to the exterior configuration of tanks 88,90 and form a cradle on which tanks 88, 90 reside. Braces 106 can be a plurality of braces that are spaced along the length of case 86, as shown, or can be a single brace that extends a portion or an entirety of the length of lower portion 98 of case 86. Preferably, tanks 88, 90 are strap mounted to braces 106 and lower portion 98 with straps 107. Alternatively, tanks 88, 90 can be neck mounted in a manner similar to that employed with fuel storage system 24 and shown in FIG. 2B.

Both upper and lower portions 96 and 98 have respective foam members 110, 112. Foam members 110, 112 are dimensioned to be complementary to the interior of upper and lower portions 96 and 98, braces 106, straps 107 and the external shape of storage tanks 88, 90. Additionally, foam members 110, 112 are dimensioned to allow space for any plumbing hardware, electrical hardware and other components associated with storage tanks 88, 90. In an alternate embodiment, as shown in FIG. 8, tanks 88, 90 are supported by lower foam member 112 and lower portion 98 of case 86. This embodiment can be used when the weight of tanks 88, 90 is small enough such that tanks 88, 90 can be safely supported by lower foam member 112 and lower portion 98 of case 86 without the need for braces 106. In this embodiment, foam members 110, 112 are in direct contact with the interior walls of respective upper and lower portions 96 and 98 such that foam members 110, 112 do not move relative to upper and lower portions 96 and 98. Each foam member 110, 112 is contoured to be complementary to an exterior contour of storage tanks 88, 90 so that storage tanks 88, 90 are secured between foam members 110, 112 when upper and lower portions 96 and 98 are attached together. Foam members 110, 112 are configured to be in direct contact with the exterior of storage tanks 88, 90 so that tanks 88, 90 are adequately supported and little movement of tanks 88, 90 relative to case 86 is possible. Thus, storage tanks 88, 90 can be supported by braces 106 and/or foam members 110, 112.

In addition to providing support for storage tanks 88, 90, foam members 110, 112 also provide energy absorption in the event of a collision of vehicle 20 or fuel storage system 84 with a foreign object. The energy absorbing characteristics of foam members 110, 112 serve to dissipate energy transferred during a collision so that storage tanks 88, 90 and the associated components are less likely to be damaged. To provide the energy absorbing characteristics, foam members 110, 112 are preferably made of a closed cell foam, such as PU (Polyurethane), Epoxy-Foam and PMI (Polymethacrylimide). However, it should be appreciated that other types of materials, such as an open cell foam or other impact absorbing materials and structures (e.g., honeycomb structure), can be used to make foam members 110, 112 without departing from the scope of the present invention. Thus, foam members 110, 112 can provide dual functionality of supporting storage tanks 88, 90 and protecting fuel storage system 84 in the event of an accident.

As stated above, foam members 110, 112 are configured to provide space for the various components of fuel storage system 84 to fit within case 86. Specifically, fuel storage system 84 includes a flow control device, in this case in the form of a pair of pressure regulators 113 that are attached to respective storage tanks 88, 90 and automatically controlled valves or solenoids 114. Pressure regulators 113 are interconnected by a fuel line 115 and are operable to control the pressure of fuel supplied by storage tanks 88, 90. Fuel line 115 and one of valves 114 enable fuel to be routed between regulators 113 and between storage tanks 88, 90 via regulators 113. A fuel fill line 116 is attached to one of regulators 113 that allows storage tanks 88, 90 to be filled with fuel. Fuel fill line 116 has a fitting 117 on its end that is configured to be connected to a complementary receptacle (not shown) on vehicle 20 to allow storage tanks 88, 90 to be filled with fuel from a convenient location on vehicle 20. A fuel supply line 118 is connected to the other of regulators 113. Fuel supply line 118 is operable to supply fuel from storage tanks 88, 90 to an internal combustion engine (not shown) or fuel cell system 26 as fuel stream 32. Fuel supply line 118 has a fitting 119 that is configured to be attached to a complementary receptacle (not shown) on vehicle 20 to supply fuel to fuel cell system 26. Fuel storage system 84 also includes temperature sensors 120 that measure the fuel temperature inside tanks 88, 90 and pressure sensors 121 that measure the pressure inside tanks 88, 90 and/or fuel lines 115, 116 and 118. Fuel storage system 84 also includes a ground cable 122 that is used to ground storage tanks 88, 90 to body 28 of vehicle 20. Ground cable 122 is bundled together with the rest of the electrical leads for the various components of fuel storage system 84 and are routed out of case 86 as a bundle 123 having a fitting 124 that can be attached to a complementary fitting (not shown) on vehicle 20 to connect the electronic controls and sensors of fuel storage system 84 to the control systems onboard vehicle 20. Thus, in the preferred embodiment pressure regulators 113, valves 114 and temperature and pressure sensors 120 and 121 are contained within case 86 and foam members 110, 112 are configured to provide recesses therein to accommodate these components of fuel storage system 84.

As stated above, fuel storage system 84 is not designed to be a secondary containment for the fuel contained within storage tanks 88, 90. Rather, fuel storage system 84 is designed to allow any gas that may occur within the interior of case 86 to be removed therefrom along with any moisture or other liquids that may find their way into the interior of case 86. To accomplish this, fuel storage system 84 utilizes natural ventilation wherein there are a plurality of openings 134 located on the top surface of upper portion 96 of case 86. Openings 134 are preferably in the form of louvers, as shown, that allow for any gases accumulated or that occur within case 86 to be vented therefrom. Louvers 134 are positioned on the top of upper portion 96 because hydrogen is lighter than air and will rise to the top of the interior of case 86. Preferably, louvers 134 are configured in conjunction with the undercarriage 30 of vehicle 20 to provide a Venturi effect wherein low pressure occurs just outside of louvers 134 so that gas within case 86 will easily flow to an exterior of case 86 through louvers 134. In addition to louvers 134, case 86 also has one or more drain holes or openings 136. Drain openings 136 are located on the bottom of lower portion 98 of case 86. Drain openings 136 allow any liquid that occurs within case 86 to be drained therefrom. Preferably, drain openings 136 have a deflector or screen to inhibit and/or avoid liquids or other contaminants from splashing up or entering case 86 via drain openings 136. To accommodate ventilation openings 134 and drain openings 136 and their operation, foam members 110, 112 have complementary openings or channels therethrough to facilitate the flow of gases and liquids out of case 86 through louvers 134 and drain openings 136. Additionally, foam members 110, 112 can be provided with an optional barrier, such as a metallic foil layer, to inhibit the permeation of leaking fuel into the cells of foam members 110, 112, in the event that a leak in fuel storage system 84 occurs.

Fuel storage system 84 can be mounted to undercarriage 30 of vehicle 20 in a variety of manners. For example, as shown in FIGS. 5-7, lower portion 98 can have a plurality of flanges 142 that extend outwardly from lower portion 98. Flanges 142 are aligned with cross members 146 on undercarriage 30 of vehicle 20 and secured to cross members 146 with bolts 150 or other mechanical fasteners, such as screws, clamps or the like. Alternatively, as shown in FIG. 8, one or more straps 154 can be secured to cross members 146 with bolts 150 to suspend case 86 from undercarriage 30 of vehicle 20. Straps 154 can be preconfigured to generally correspond to the external configuration of case 86 and the location of cross members 146 or can be flexible so that straps 154 can be used with a variety of cases 86 having differing external configurations.

Fuel storage system 84 is installed in vehicle 20 as a modular unit. That is, case 86, storage tanks 88, 90, regulators 113, 114, and fuel lines 115, 116 and 118, sensors 120, 121, ground cable 122 and the associated electrical wires in bundle 123 are preassembled in a separate facility or in a static station. Then, modular fuel storage system 84 is installed on undercarriage 30 of vehicle 20 as a modular unit on the assembly line, which may be a moving one. To install modular fuel storage system 84, flanges 142 are aligned with cross members 146 and bolts 150 are then used to secure flanges 142 to cross members 146. Alternately, modular fuel storage system 84 is positioned adjacent undercarriage 30 and one or more straps 154 are positioned below case 86 and aligned with cross members 146 so that bolts 150 can be used to install straps 154 to undercarriage 30 and thereby suspend modular fuel storage system 84 from undercarriage 30. Fittings 117, 119 on respective fuel fill and supply lines 116 and 118 and fitting 124 on bundle 123 can then be connected to complementary receptacles on vehicle 20.

It should be appreciated that while storage tanks 38, 40, 88, 90 are shown as being cylindrical or cylindrical in shape, other shapes, including non-cylindrical and asymmetrical shapes for storage tanks 38, 40, 88, 90 can be employed without departing from the scope of the present invention. Additionally, fuel storage system 24 and 84 can be mounted to vehicle 20 in locations other than adjacent undercarriage 30. For example, fuel storage systems 24 and 84 can be mounted in an interior compartment of vehicle 20 that is separated from the passenger compartments, such as under a front section of vehicle 20 adjacent an internal combustion engine (not shown) or fuel cell system 26. Additionally, it should be appreciated that while fuel storage systems 24 and 84 are shown as being installed on a passenger vehicle, fuel storage systems 24 and 84 can be employed on other types of vehicles such a buses, trucks and the like without departing from the scope of the invention. Additionally, a fuel sensor, such as a hydrogen sensor, can be employed in fuel storage system 84 to signal an alarm in the event that a fuel leak occurs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A modular fuel storage assembly for a vehicle, the modular fuel storage assembly comprising:

at least one gas storage tank operable to store a gaseous fuel and to supply a stored gaseous fuel;

a frame operable to support said storage tank; and wherein said storage tank is attached to said frame, said frame and said attached storage tank are adapted to be installed in the vehicle as a modular unit, said frame is pivotally connected to the vehicle and operable to pivot between a first operative position and a second serviceable position, and said storage tank pivots with said frame between said first and second positions.

2. The modular fuel storage assembly of claim 1, further comprising a shield attached to said frame and covering a portion of said frame.

3. The modular fuel storage assembly of claim 1, wherein said frame is pivotally connected to the vehicle with at least one hinge.

4. The modular fuel storage assembly of claim 1, wherein said storage tank is neck mounted to said frame.

5. The modular fuel storage assembly of claim 1, wherein said storage tank is strap mounted to said frame.

6. The modular fuel storage assembly of claim 1, wherein said at least one storage tank is at least two storage tanks.

7. The modular fuel storage assembly of claim 1, wherein said frame and said attached storage tank are adapted to be installed to an undercarriage of the vehicle as a modular unit.

8. The modular fuel storage assembly of claim 1, further comprising:

at least one pressure regulator operable to regulate pressure of said stored fuel supplied to the vehicle;

at least one fuel line connected to said regulator and operable to supply said stored fuel to the vehicle; and wherein said pressure regulator and said at least one fuel line are connected to said modular unit and are installed in the vehicle as part of said modular unit.

9. A fuel storage assembly for a vehicle, the fuel storage assembly comprising:

a frame operable between a first operable position and a second serviceable position relative to a vehicle, said frame being coupled to said vehicle in both said first and second positions; and at least one storage tank operable to store a fuel and to supply a stored fuel, said storage tank being mounted to said frame and moving with movement of said frame between said first and second positions, wherein said first position does not allow access to said storage tank and said second position allows access to opposing ends of said storage tank.

10. The fuel storage assembly of claim 9, wherein said frame is pivotally connected to said vehicle with at least one hinge.

11. The fuel storage assembly of claim 9, wherein said first position corresponds to said frame supporting said storage tank adjacent an undercarriage of a vehicle and said second position corresponds to said frame supporting said storage tank away from said undercarriage of said vehicle and allowing access to said storage tank.

12. The fuel storage assembly of claim 9, wherein said storage tank is neck mounted to said frame.

13. The fuel storage assembly of claim 9, wherein said storage tank is strap mounted to said frame.

14. The fuel storage assembly of claim 9, wherein said at least one storage tank is at least two storage tanks.

15. The fuel storage assembly of claim 9, further comprising a shield attached to said frame and covering a portion of said frame.

16. An automotive vehicle comprising:

a body having an undercarriage; and a fuel storage system, said fuel storage system comprising:
- a cradle operable between first and second positions relative to said undercarriage;
- at least one storage tank operable to store a fuel and to supply a stored fuel, said storage tank being mounted to said cradle and moving with movement of said cradle between said first and second positions, wherein said cradle remains coupled to said body in said first and second positions, said first position is an operable position with said cradle and said storage tank adjacent said undercarriage and said second position is a serviceable position with said cradle and said storage tank suspended from said body and spaced apart from said undercarriage thereby allowing access to said storage tank.

17. The vehicle of claim 16, wherein said cradle is pivotally mounted to said undercarriage.

18. The vehicle of claim 16, wherein said undercarriage is configured to be complementary to an exterior of said at least one storage tank.

19. The vehicle of claim 16, wherein said cradle pivots between said first and second positions.

20. The vehicle of claim 19, wherein said cradle is attached to at least one hinge and said cradle pivots about said at least one hinge when moving between said first and second positions.

21. The vehicle of claim 16, further comprising a fuel cell system including a fuel cell stack operable to react fuel stored in said storage tank to produce electrical power.

22. A method of installing a modular fuel storage system onto a vehicle wherein the modular fuel storage system includes a cradle operable between first and second positions and at least one storage tank coupled to the cradle, the method comprising:
- (a) preassembling the at least one storage tank to the cradle at a first station removed from the vehicle; and
- (b) assembling the modular fuel storage system onto the vehicle at a second station by pivotally coupling the cradle to the vehicle such that the cradle and the storage tank can pivot between first and second positions relative to the vehicle.

23. The method of claim 22, wherein assembling further includes pivotally coupling the cradle to the vehicle with at least one hinge.

24. The method of claim 22, wherein preassembling further includes preassembling a pressure regulator and a fuel line to the at least one storage tank.

25. The method of claim 24, wherein assembling further includes connecting said fuel line to a complementary fuel line on the vehicle.

26. The method of claim 22, wherein preassembling further includes at least one of strap mounting the storage tank to the cradle and neck mounting the storage tank to the cradle.

27. The method of claim 22, wherein preassembling further includes attaching a shield to the cradle.

28. The method of claim 22, wherein preassembling further includes preassembling at least two storage tanks to the cradle.

29. The method of claim 22, wherein preassembling further includes testing the modular fuel storage system.

30. A method of servicing a fuel storage system on a vehicle wherein the fuel storage system has a frame operable between first and second positions relative to the vehicle and at least one storage tank connected to the frame and moving with movement of the frame between the first and second positions, the method comprising:
- (a) moving the frame from the first position to the second position, said frame remaining coupled to the vehicle in both said first and second positions;
- (b) servicing the fuel storage system with said frame coupled to the vehicle; and
- (c) moving the frame from the second position to the first position.

31. The method of claim 30, wherein moving the frame from the first position to the second position includes pivoting the frame from the first position to the second position.

32. The method of claim 30, wherein moving the frame from the first position to the second position includes moving the frame from a position corresponding to the at least one fuel storage tank being positioned adjacent the vehicle to a position corresponding to the at least one fuel storage tank being positioned away from the vehicle.

* * * * *